(12) United States Patent
Guerinon

(10) Patent No.: US 8,689,844 B2
(45) Date of Patent: Apr. 8, 2014

(54) TIRE WITH CROWN COMPRISING A LAYER OF VERY HIGH MODULUS RUBBER MIX

(75) Inventor: Bernard Guerinon, Clermont-Ferrand (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 567 days.

(21) Appl. No.: 12/988,507

(22) PCT Filed: Apr. 3, 2009

(86) PCT No.: PCT/EP2009/054038
§ 371 (c)(1),
(2), (4) Date: Jan. 4, 2011

(87) PCT Pub. No.: WO2009/127543
PCT Pub. Date: Oct. 22, 2009

(65) Prior Publication Data
US 2011/0108179 A1  May 12, 2011

Related U.S. Application Data

(60) Provisional application No. 61/133,689, filed on Jul. 1, 2008.

(30) Foreign Application Priority Data

Apr. 16, 2008  (FR) ...................................... 08 52558

(51) Int. Cl.
*B60C 9/18*  (2006.01)
*B60C 9/22*  (2006.01)
*B60C 11/00*  (2006.01)

(52) U.S. Cl.
USPC ......... 152/209.5; 152/531; 152/532; 152/537

(58) Field of Classification Search
USPC .................... 152/532, 537, 209.5–209.7, 531
See application file for complete search history.

(56) References Cited

U.S. PATENT DOCUMENTS 4,838,330 A    6/1989  Takayama
6,640,861 B2 * 11/2003  Pereira et al. ................. 152/532

FOREIGN PATENT DOCUMENTS

FR    2 499 912 A1 *  8/1982
FR    2 789 941 A1 *  8/2000

* cited by examiner

*Primary Examiner* — Adrienne C Johnstone
(74) *Attorney, Agent, or Firm* — Cozen O'Connor

(57) ABSTRACT

A tire includes two beads configured to come into contact with a mounting rim and two sidewalls extending the beads radially to the outside, the two sidewalls being joined together in a crown. A crown reinforcement extends axially between two axial ends and is surmounted by a tread. The crown includes, radially on the inside of the tread and radially on the outside of a carcass reinforcement, at least one first layer of rubber mix having a modulus of elasticity which is greater than or equal to 50 MPa, this first layer extending from the median plane of the tire axially to the outside, on both sides of the median plane, only as far as an axial distance from the median plane which is less than the axial distance of the axial end of the crown reinforcement from the median plane.

13 Claims, 7 Drawing Sheets

TIRE WITH CROWN COMPRISING A LAYER OF VERY HIGH MODULUS RUBBER MIX

RELATED APPLICATIONS

This is a U.S. national stage of International application No. PCT/EP2009/054038, filed on Apr. 3, 2009.

This patent application claims the priority of French patent application no. 08/52558 filed Apr. 16, 2008 and U.S. Provisional application 61/133,689 filed Jul. 1, 2008, the disclosure content of both of which is hereby incorporated by reference.

FIELD OF THE INVENTION

The present invention relates to tires for passenger vehicles, and in particular the crowns of said tires.

BACKGROUND OF THE INVENTION

Tires for passenger vehicles generally comprise two beads which are configured to come into contact with a mounting rim, as well as two sidewalls extending the beads radially to the outside and being joined together in a crown. A carcass reinforcement comprising a plurality of elements for reinforcing the carcass is anchored in the two beads and extends across the sidewalls towards the crown. The crown comprises a crown reinforcement, generally formed by at least two reinforcing layers each comprising a plurality of thread-like crown reinforcing elements, said crown reinforcing elements being parallel to one another in each layer and the reinforcing elements of one layer extending crosswise with respect to those of the other. The crown reinforcement is surmounted by a tread designed to come into contact with the ground when the tire rolls along.

It is well known that in harsh conditions of use, gradually as the distances covered increase, fissures may appear at the ends of the thread-like elements forming the reinforcing layers of the crown reinforcement. Said fissures may then spread along the thread-like elements, then join up between two or more thread-like elements and thus result in a separation of the lateral ends of the two crown reinforcing layers.

In order to limit the initiation and spread of these fissures, strips of rubber mix are usually inserted between the ends of the reinforcing layers, the rubber mix of the strips having identical modulus of elasticity, or even lower modulus of elasticity than that of the layers of rubber mix of the reinforcing layers of the crown reinforcement.

The document U.S. Pat. No. 6,640,861 reveals a tire the crown structure of which is capable of limiting the phenomena of separation of the lateral ends of the crown reinforcing plies such that they occur only at significant levels of stress. This object is achieved by a particular arrangement of the rubber mixes provided between the thread-like elements of the crown reinforcement. The threads of at least one of the two reinforcing layers are successively in contact, on the same side as the layer, moving axially from the median plane of the tire towards the lateral ends of the reinforcing layer with, at least, a first layer of rubber mix having a first modulus of elasticity (typically between 9 and 13 MPa), then a second layer of rubber mix having a second modulus of elasticity lower than the first (typically less than 5 MPa). This second layer has the advantage of better resisting the formation of fissures in the lateral end zones of the reinforcing layers which are considerably stressed.

A similar structure is described in the document U.S. Pat. No. 6,776,205 which discloses a tire having reduced rolling resistance. Between the superimposed reinforcing layers of the crown reinforcement are located, arranged axially in an adjacent manner, at least two layers of rubber mix having different mechanical properties, each of the layers being in contact with the threads of the superimposed reinforcing layers. According to a preferred embodiment disclosed, the ratio between the moduli of elasticity of the second layer and of the first layer (of which the modulus is between 10 and 15 MPa) is between 0.05 and 0.8, and even more preferably between 0.5 and 0.7.

A drawback of these solutions is in the fact that these tires have the tendency to exhibit irregular wear, associated with the fact that the flattening of the tire is insufficient, which leads to premature wear in the centre of the tire. To reduce this drawback, it is known to provide a small hooping reinforcement (also known as a bracing layer) generally made of polyester, in the central part of the crown. The presence of this hooping layer has, however, the drawback of complicating the tire manufacturing process and increasing its cost.

SUMMARY OF THE INVENTION

One of the objects of the present invention is to provide a tire for passenger vehicles having good endurance and low rolling resistance, while having less tendency to be worn in an irregular manner, without being detrimental to the manufacturing process and cost.

This object is achieved by a tire comprising:

two beads configured to come into contact with a mounting rim;

two sidewalls extending the beads radially to the outside, the two sidewalls being joined together in a crown comprising a crown reinforcement extending axially between two axial ends and surmounted by a tread;

a carcass reinforcement comprising a plurality of carcass reinforcing elements, the carcass reinforcement being anchored in the two beads and extending across the sidewalls toward the crown.

The crown of a tire according to an embodiment of the invention comprises, radially on the inside of the tread and radially on the outside of the carcass reinforcement, at least one first layer of rubber mix having a modulus of elasticity which is greater than or equal to 50 MPa, and preferably greater than or equal to 100 MPa, this first layer extending from the median plane of the tire axially to the outside, on both sides of the median plane, as far as an axial distance from the median plane which is less than the axial distance of the axial end of the crown reinforcement from the median plane, this first layer being extended axially to the outside, on both sides of the median plane, by a second layer of rubber mix having a modulus of elasticity which is less than or equal to 20 MPa and preferably less than or equal to 12 MPa.

Thus, a tire according to such embodiment of the invention is distinguished by the use, in the crown, of rubber mixes having a very high modulus of elasticity, which is contrary to all normal usage. Rubber mixes having such moduli of elasticity are generally used in the beads, but their use in the crown has remained exceptional. The only case known by the inventors where the use of rubber mixes having a modulus of elasticity of 40 MPa in the crown of a tire has been proposed, concerns tires for "heavy goods" vehicles, without a crown reinforcement comprising threads that are inclined with respect to the circumferential direction. More specifically, the document AU 725 389 reveals a tire in which the reinforcing layers of the crown reinforcement are replaced by a pad of rubber mix having a modulus of elasticity of 40 MPa. While this type of structure may function in an application for "heavy goods" vehicles, as the cornering stiffness required for this type of vehicle is relatively low, it would not be viable in a tire for passenger vehicles, where the cornering stiffness is a much more decisive factor.

One of the main reasons which explain why the rubber mixes of very high modulus of elasticity have not found application in the crowns of tires, and in particular tires for passenger vehicles, lies in the well known fact that the increase in the modulus of the rubber mixes in this zone causes a reduction in the endurance of the tire and an increase in the noise generated by the tire and thus a reduction in comfort of the user of the vehicle and of the people who are located in the vicinity of the vehicle when it travels. One could have thought that an increase in the modulus of the rubber mix to extremely high values would cause a very significant reduction in the life of the tire and an unacceptable increase in the noise generated by the tire. However, in a surprising manner, the tires according to the invention have acceptable endurance and acceptable acoustic behavior, as will be explained below.

According to a first advantageous embodiment, the crown reinforcement comprises at least two reinforcing layers, each comprising a plurality of thread-like crown reinforcing elements, said crown reinforcing elements being parallel to one another in each layer and the reinforcing elements of one layer extending crosswise with respect to those of the other, forming with the circumferential direction angles of between 10° and 70°, and said first and second layers of rubber mix are located between at least two of these reinforcing layers. The advantage of this embodiment lies in its great structural simplicity: the rubber mix of very high modulus is "sandwiched" between the thread-like reinforcing elements of the crown reinforcement.

According to an advantageous variant of this embodiment, the number of reinforcing layers of the crown reinforcement is greater than or equal to three, and a first and a second layer of rubber mix are located between each pair of adjacent reinforcing layers. Thus, the crown reinforcement is rigidified in depth and it is possible to reduce the thickness of each first layer (and, as a result, the radial distance between the thread-like reinforcing elements) while maintaining good flattening of the tire.

It is, in particular, possible to provide that said first and second layers are in contact with the reinforcing elements of the closest (adjacent) reinforcing layers. This configuration has the advantage of a greater structural simplicity. Its positioning thus does not cause any excess thickness in the region of the crown. Moreover, it permits the forces to be transmitted very efficiently, as there are no intermediate layers of mixes of low modulus of elasticity which could reduce this efficiency. It may be easily implemented, in particular, using a special manufacturing process, known per se, by the name "C3M". In this process, the tire is made on a rigid core determining the shape of its internal cavity, such as those disclosed by U.S. Pat. No. 4,895,692 or U.S. Pat. No. 6,224,808 the contents of which are hereby incorporated by reference. According to the order required by the final structure, all the constituents of the tire are applied to this core and are arranged directly in their final position, without undergoing shaping at any point of the production process. The reinforcing elements are thus positioned individually on the rubber mix which has been previously deposited. For more details, the reader is referred to the documents U.S. Pat. No. 4,804,436, U.S. Pat. No. 4,963,207 and U.S. Pat. No. 5,185,051 the contents of which are hereby incorporated by reference. The curing takes place on the core, said core only being removed after the vulcanization phase.

Alternatively, it is possible to provide a third layer of rubber mix which separates said first and second layers from the reinforcing elements of the closest reinforcing layers. This configuration proves particularly advantageous when the tire has to be manufactured by a conventional manufacturing process. Thus sheets of rubber mix having a very high modulus are positioned between the plies forming the crown reinforcing layers. Thus it is avoided having to calender these plies with a plurality of rubber mixes having different moduli.

According to a variant, one first and two second layers of rubber mix are located radially inside the radially innermost reinforcing layer of the crown reinforcement.

According to a second advantageous embodiment, the tire further comprises a hooping reinforcement, arranged radially outside the crown reinforcement, said hooping reinforcement being formed from at least one reinforcing element oriented circumferentially. The presence of this hooping reinforcement makes it possible to improve further the flattening of the tire and its geometric stability at high traveling speeds.

According to a variant of this embodiment, one first and two second layers of rubber mix are located radially outside the hooping reinforcement.

According to a further variant of this embodiment, one first and two second layers of rubber mix are located radially between the hooping reinforcement and the radially outermost reinforcing layer of the crown reinforcement.

All these embodiments and their different variants may be applied to a tire of which the carcass reinforcement extends axially across the entire crown. In particular, it is thus possible to provide one first and two second layers of rubber mix radially between the crown reinforcement and the carcass reinforcement. They may also be applied to a tire of which the carcass reinforcement does not extend beneath the entire crown. In this case, the feature "radially outside the carcass reinforcement" is naturally understood as "having a radial position which is radially outside the radial position of the radially outermost ends of the portions of the carcass reinforcement in each sidewall".

Naturally, it is possible to combine the different embodiments with one another.

Advantageously, and whatever the selected embodiment(s), the axial distance between the axial ends of each first layer and the closest axial end of the crown reinforcement is greater than 10 mm and preferably greater than 20 mm. Tests have shown that the endurance of the tire is considerably reduced when the rubber mix of very high modulus is brought closer to the axial ends.

When the first embodiment is implemented, it is advantageous for the same reason (i.e. the endurance of the tire) to provide that the reinforcing layers of the crown reinforcement do not all have the same axial width and that the axial distance between the axial ends of each first layer and the closest axial end of the reinforcing layer of smallest axial width of the crown reinforcement is greater than 10 mm and preferably greater than 20 mm.

DETAILED DESCRIPTION OF THE DRAWINGS

Figure 1:
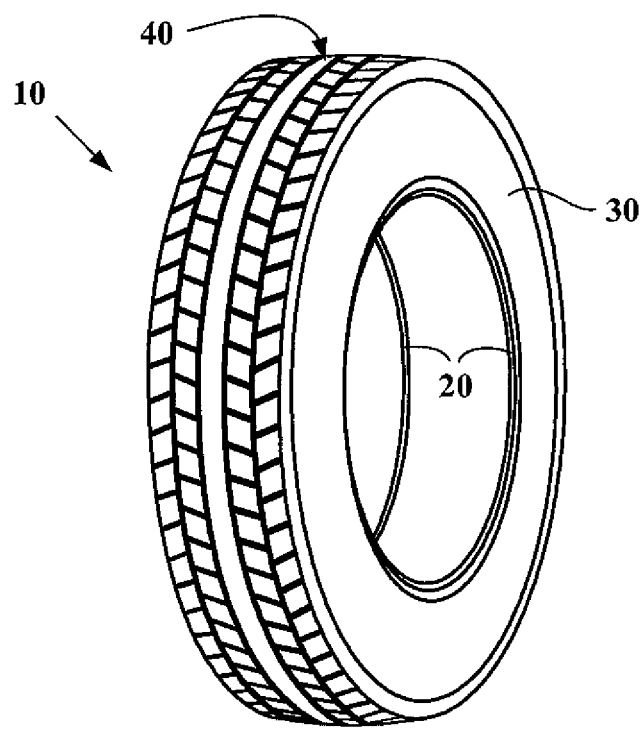
FIG. 1 shows a tire according to the prior art.

When using the term "radial" it is necessary to distinguish several different uses of the word by those skilled in the art. Firstly, the expression refers to a radius of the tire. It is in this sense that it is said of a point P1 that it is "radially inside" a point P2 (or "radially on the inside" of point P2) if it is closer to the axis of rotation of the tire than point P2. Conversely, a point P3 is said to be "radially outside" a point P4 (or "radially on the outside" of point P4) if it is further away from the axis of rotation of the tire than point P4. One is said to advance "radially to the inside (or to the outside)" when advancing in the direction of smaller radii (or larger radii). The expressions "radially innermost" and "radially outermost" are used analogously. This meaning of the term also applies in the context of radial distances.

In contrast, a thread or a reinforcement is known as "radial" when the thread or the reinforcing elements of the reinforcement form with the circumferential direction an angle greater than or equal to 80° and less than or equal to 90°. Specifically in the present document, the term "thread" has to be understood in a very general sense and includes threads in the form of monofilaments, multifilaments, a cable, a yarn or equivalent assembly, irrespective of the material forming the thread or the surface treatment to promote its connection with the rubber.

Finally, by "radial section" is understood a section along a plane which contains the axis of rotation of the tire.

An "axial" direction is a direction parallel to the axis of rotation of the tire. A point P5 is said to be "axially inside" a point P6 (or "axially on the inside" of point P6) if it is closer to the median plane of the tire than point P6. Conversely, a point P7 is said to be "axially outside" a point P8 (or "axially on the outside" of point P8) if it is further away from the median plane of the tire than point P8. The "median plane" of the tire is the plane which is perpendicular to the axis of rotation of the tire and which is located equidistant from the annular reinforcing structures of each bead.

A "circumferential" direction is a direction which is perpendicular both to a radius of the tire and the axial direction.

Two reinforcing elements are said to be "parallel" in this document when the angle formed between the two elements is less than or equal to 20°.

Within the scope of this document, the expression "rubber mix" denotes a rubber composition comprising at least one elastomer and a filler.

By "modulus of elasticity" of a rubber mix is understood the secant modulus of extension obtained in traction according to ASTM standard D 412 of 1998 (specimen "C"): the secant modulus apparent at 10% elongation, denoted "MA10" and expressed in MPa (standard temperature and hygrometric conditions according to ASTM standard D 1349 of 1999) is measured in a second elongation (i.e. after a cycle of accommodation). This modulus of elasticity may be differentiated from the moduli of elasticity obtained in compression and of which the values generally have no connection with the moduli obtained in extension.

When it is said that a layer of rubber mix is "in contact" with a reinforcing element of a reinforcing layer, it must be understood that at least one part of the external circumference of the reinforcing element is in close contact with the rubber mix. If the reinforcing element comprises a coating, the term "contact" means that it is the external circumference of this coating which is in close contact with the rubber mix.

FIG. 1 shows schematically a tire 10 according to the prior art. The tire 10 comprises two beads 20 configured to come into contact with a mounting rim (not shown), two sidewalls 30 extending the beads 20 radially to the outside, the two sidewalls being joined together in a crown comprising a crown reinforcement (not visible in FIG. 1) surmounted by a tread 40.

Figure 2:
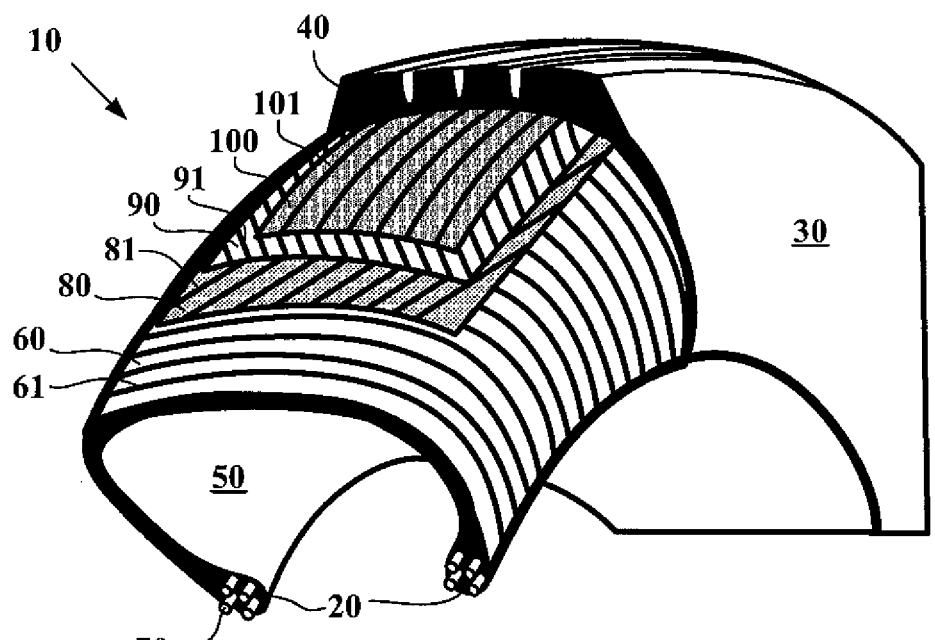
FIG. 2 shows a partial perspective view of a tire according to the prior art.

FIG. 2 shows a partial perspective view of another tire 10 according to the prior art and illustrates the different components of the tire. The tire 10 comprises an inner liner 50 made of an impermeable rubber mix, a carcass reinforcement 60 comprising threads 61 coated with a rubber mix, and two beads 20 each comprising annular reinforcing structures 70 which maintain the tire 10 on the rim (not shown). The tire 10 further comprises a crown reinforcement comprising two plies 80 and 90. Each of the plies 80 and 90 is reinforced by thread-like reinforcing elements 81 and 91 which are parallel to one another in each layer and the reinforcing elements of one layer extending crosswise with respect to those of the other, forming with the circumferential direction angles of between 10° and 70°. The tire further comprises a hooping reinforcement 100 arranged radially outside the crown reinforcement, said hooping reinforcement being formed from reinforcing elements 101 oriented circumferentially and wound in a spiral. A tread 40 is placed on the hooping reinforcement; it is this tread 40 which ensures the contact of the tire 10 with the road.

FIGS. 3 to 19 show, in radial section, a part of a tire according to embodiments of the invention. Only one half of the crown, extending from the median plane 150 (indicated in dotted lines) as far as the radial external end of the sidewall, is shown. The crown is preferably symmetrical relative to the median plane 150 but this is not a limiting feature of the invention. There may be good reasons, apart from the problem of flattening the tire, for providing a crown in which the geometry and/or the nature of the layers of rubber mix and/or the arrangement of the reinforcing elements vary from one half of the crown to the other. The crowns shown comprise two reinforcing layers, each comprising a plurality of thread-like reinforcing elements 81 and 91, said reinforcing elements 81 and 91 being parallel to one another in each layer and the reinforcing elements of one layer extending crosswise with respect to those of the other, forming with the circumferential direction angles of between 10° and 70°.

It should be noted that while FIGS. 3 to 17 all represent tires having a hooping reinforcement formed from reinforcing elements 101 oriented circumferentially, it does not refer here to an essential feature of the invention, one of the objects of which is to make such a hooping reinforcement optional.

FIGS. 3 to 6 show tires comprising a single first layer 111 of rubber mix having a modulus of elasticity which is greater than or equal to 50 MPa. This first layer 111 extends from the median plane 150 of the tire axially to the outside, on both sides of the median plane, as far as an axial distance Dp (indicated in FIG. 3) from the median plane, which is less by at least 10 mm than the axial distance Da (indicated in FIG. 3) from the median plane 150 to the axial end of the crown reinforcement. The first layer 111 is extended axially to the outside, on both sides of the median plane 150, by a second layer 121 of rubber mix having a modulus of elasticity which is less than or equal to 20 MPa. Adjacent ends of layers 111 and 121 are in engagement.

Figure 3:
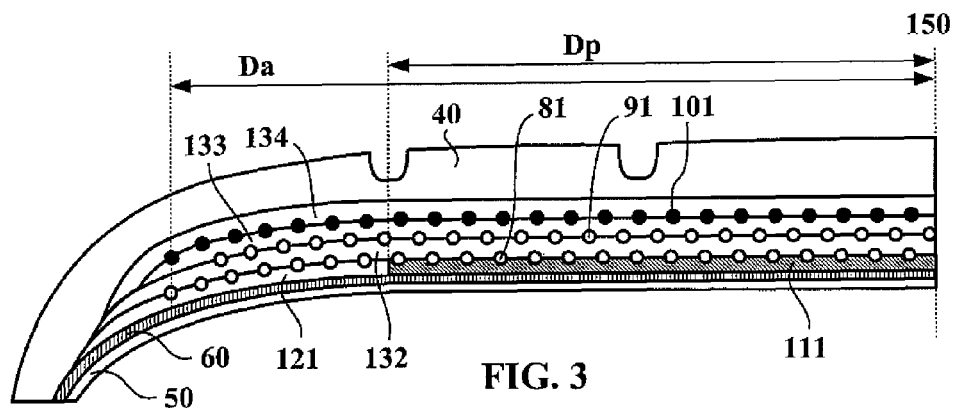
FIGS. 3 to 19 show, in radial section, a part of a tire according to embodiments of the invention.

FIG. 3 shows a variant of the invention in which the first layer 111 and the second layer 121 are located radially inside the radially innermost reinforcing layer of the crown reinforcement which is formed by the reinforcing elements 81. It may be seen that the first layer 111 and the second layer 121 are both in contact with the reinforcing elements 81 of this reinforcing layer. The space between the reinforcing layers formed by the reinforcing elements 81 and 91 and between the reinforcing elements 91 and 101 is filled by layers 132 and 133 of rubber mix the modulus of elasticity of which is less than 20 MPa. This is also the case of the layer 134 of rubber mix which separates the hooping reinforcement from the tread 40.

Figure 4:
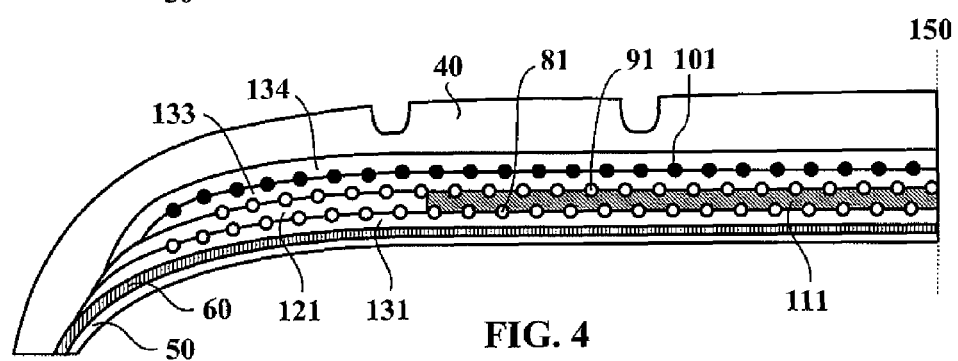

FIG. 4 shows a variant in which the first layer 111 and the second layer 121 are located between the two reinforcing layers.

Figure 5:
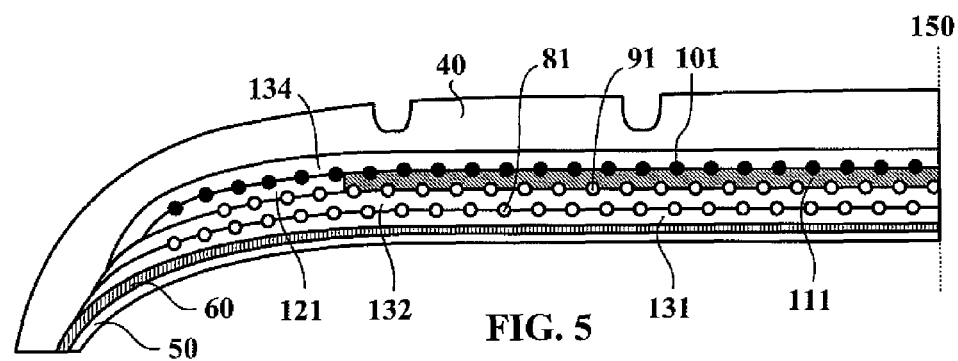

FIG. 5 shows a tire in which the first layer 111 and the second layer 121 are located between the radially outermost reinforcing layer of the crown reinforcement formed by the reinforcing elements 91, and the hooping reinforcement formed by the reinforcing elements 101.

Figure 6:
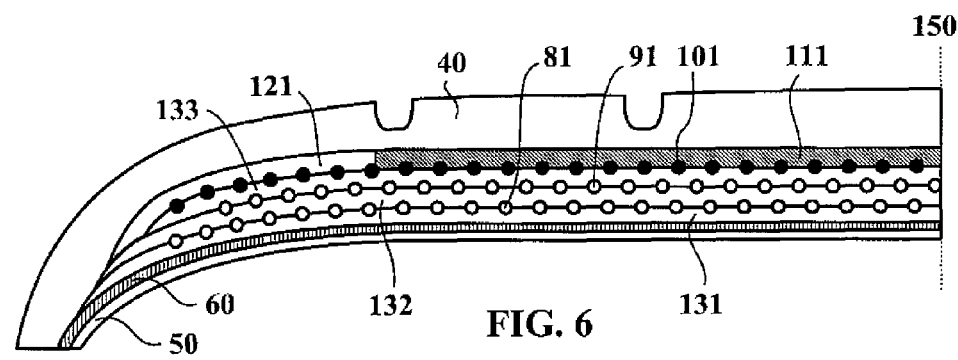

In the tire shown in FIG. 6, finally, the first layer 111 and the second layer 121 are located between the hooping reinforcement formed by the reinforcing elements 101 and the tread 40.

FIGS. 7 to 12 correspond to different cases which may be envisaged when two first layers 111 and 112 of very high modulus and two second layers 121 and 122 (four second layers if the second half of the crown, which is not shown, is taken into account) are provided in the crown.

Figure 7:
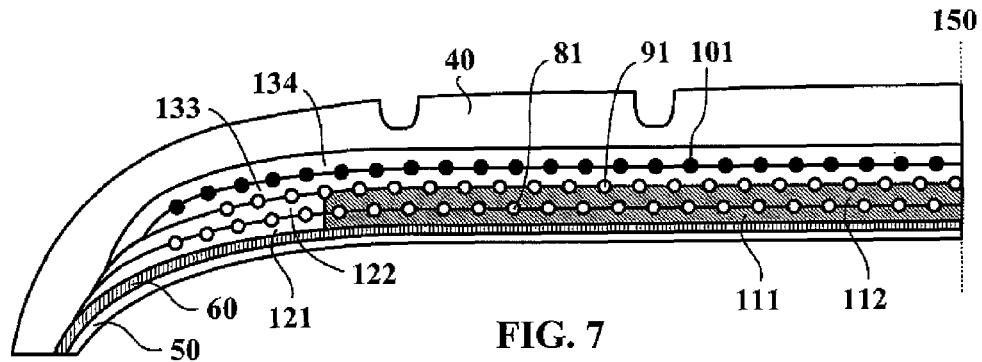
Figure 8:
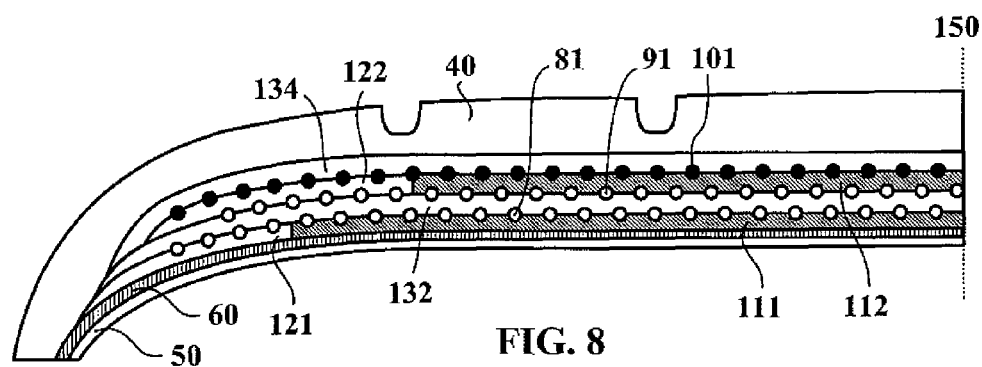
Figure 9:
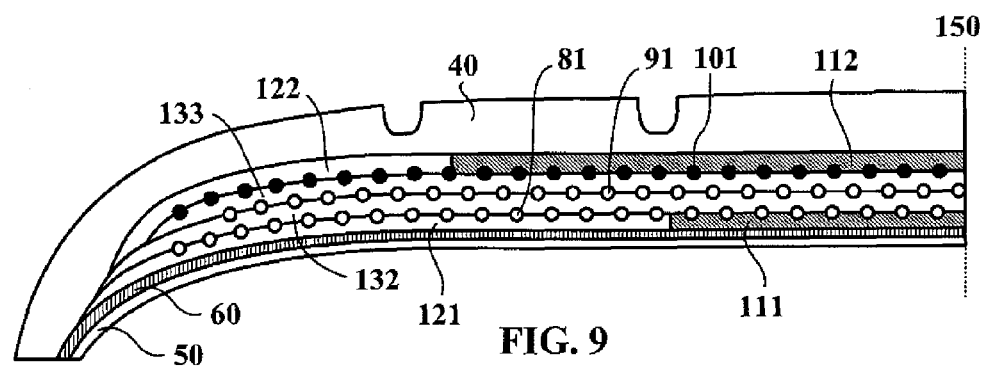
Figure 10:
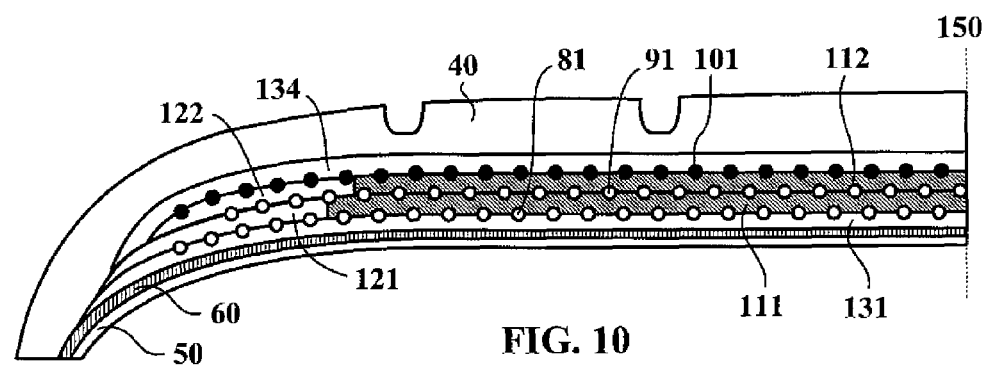
Figure 11:
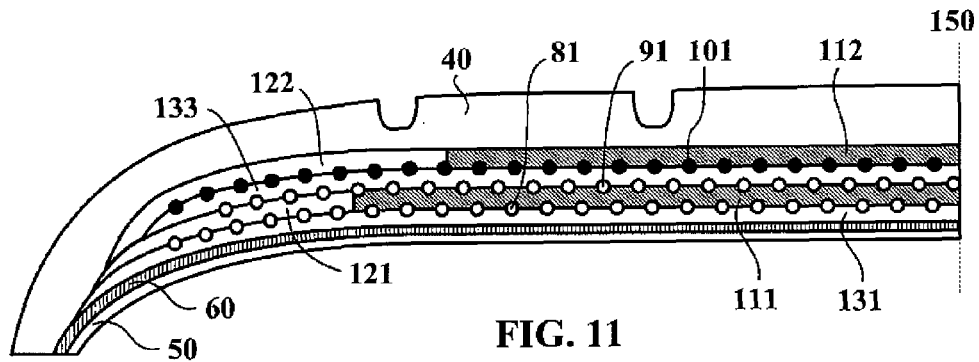
Figure 12:
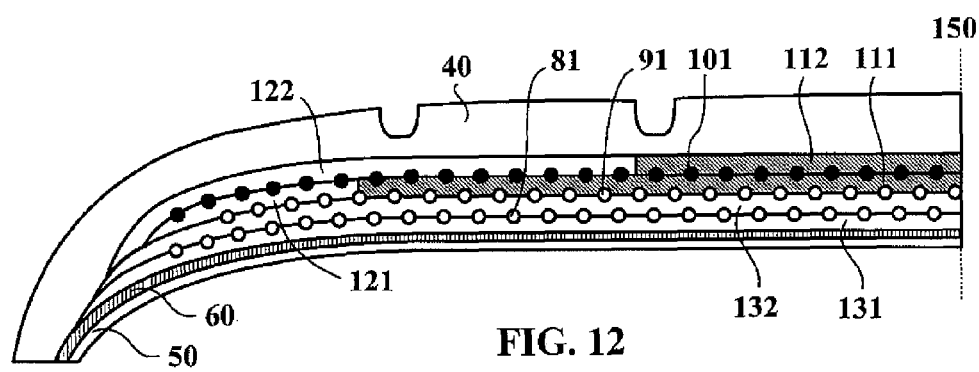
Figure 13:
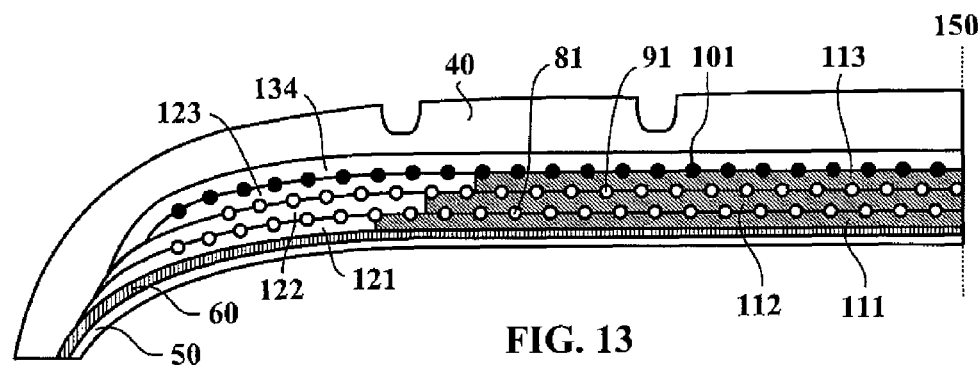
Figure 14:
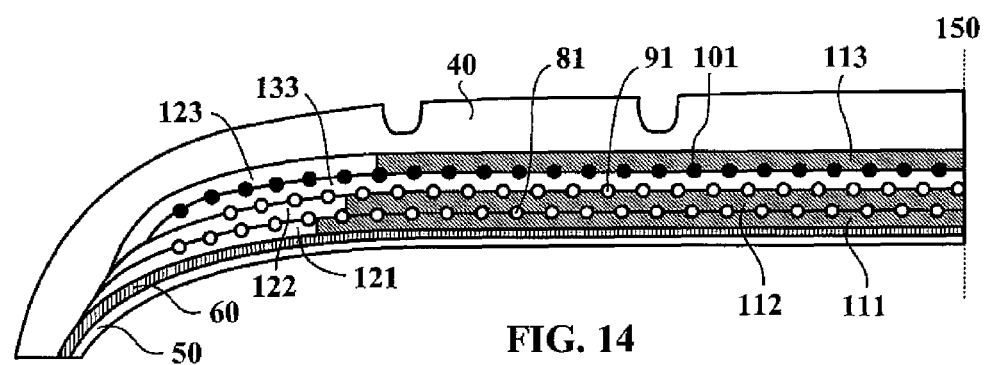
Figure 15:
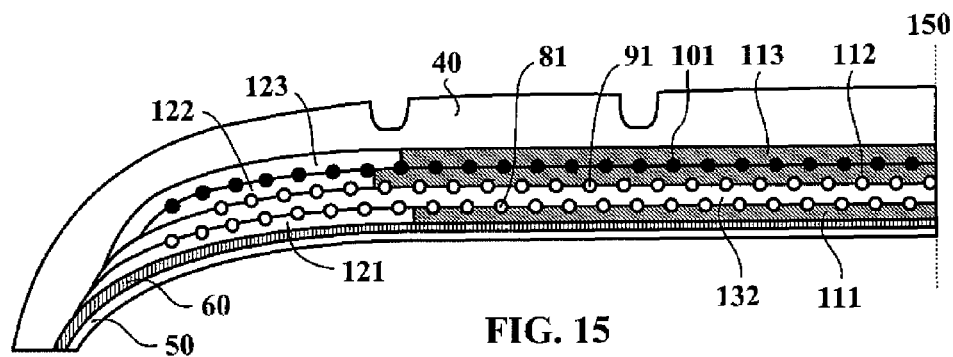
Figure 16:
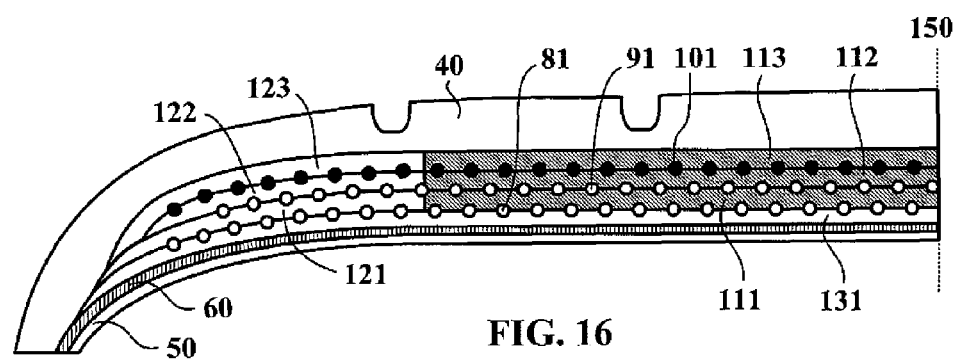

The two layers may be adjacent as is the case in FIGS. 7, 10 and 12 or separated by one or two layers of rubber mix of lower modulus (the layer 132 in FIG. 8, the layers 132 and 133 in FIG. 9, the layer 133 in FIG. 11).

It will be noted that the two first layers 111 and 112 do not necessarily have the same axial width. The designer of the tires has a degree of freedom here making it possible to adjust the rigidity of the crown to particular requirements. Such rigidity is affected by the axial width of the first and second layers 111, 112. However, having one or more of these first layers come too close to the axial ends of the adjacent reinforcing layers is to be avoided (i.e. one should maintain a minimum axial distance of 10 mm and preferably 20 mm).

If it is desired to rigidify further the centre of the crown, three first layers 111 to 113 may be provided bordered by layers 121 to 123, as is shown in FIGS. 13 to 16. The first three layers 111 to 113 do not necessarily have the same axial width.

Figure 17:
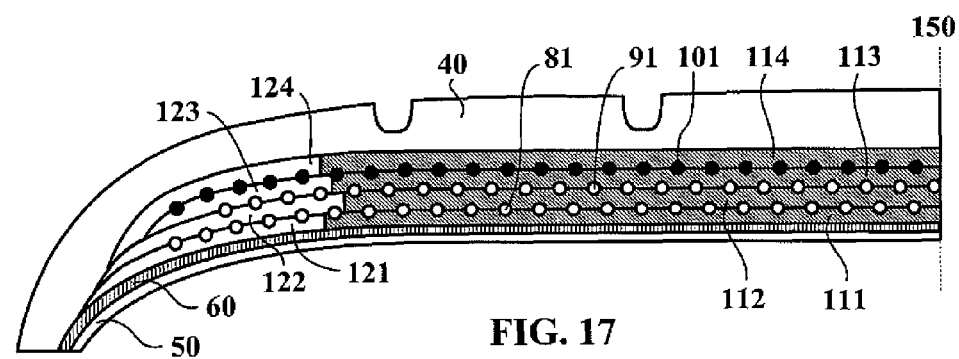

FIG. 17 shows a tire comprising four first layers 111 to 114 of very high modulus, each bordered by layers 121 to 124. The four first layers 111 to 114 do not necessarily have the same axial width.

In the tires shown in FIGS. 3 to 17, the first layer (layers) and the second layers are in contact with the reinforcing elements of the adjacent reinforcing layers. This configuration may be easily obtained, in particular using a special manufacturing process, known per se by the name "C3M", in which the reinforcing elements are placed individually on the rubber mix which has been previously deposited. The invention is, however, not limited to this type of structure. It also includes variants in which the reinforcing elements of the reinforcing layers are embedded in the rubber mix of low modulus of elasticity (typically 10 MPa or less). This configuration is preferable when the tire has to be manufactured using a conventional manufacturing process. Thus sheets of rubber mix of very high modulus are placed between the plies forming the layers of the crown reinforcement. As a consequence, one does not have to calender these plies with a rubber mix of very high modulus.

Figure 18:
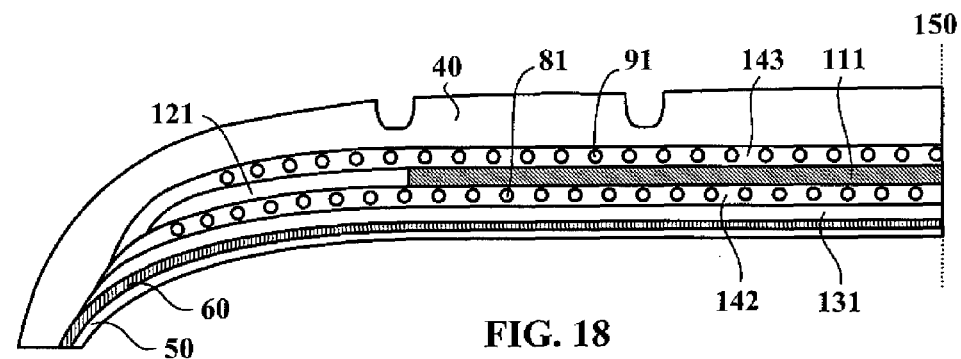

FIG. 18 shows a tire corresponding to this embodiment. The first layer 111 of rubber mix is sandwiched between two plies 142 and 143, each formed from reinforcing elements 81 and 91 embedded in rubber mixes 132 and 133, the modulus of which is less than 15 MPa. As a consequence, there is no contact between the first and second layers 111, 121 on the one hand and the reinforcing elements 81, 91 on the other hand. The rubber forming part of the plies 142, 143 prevents such contact.

Figure 19:
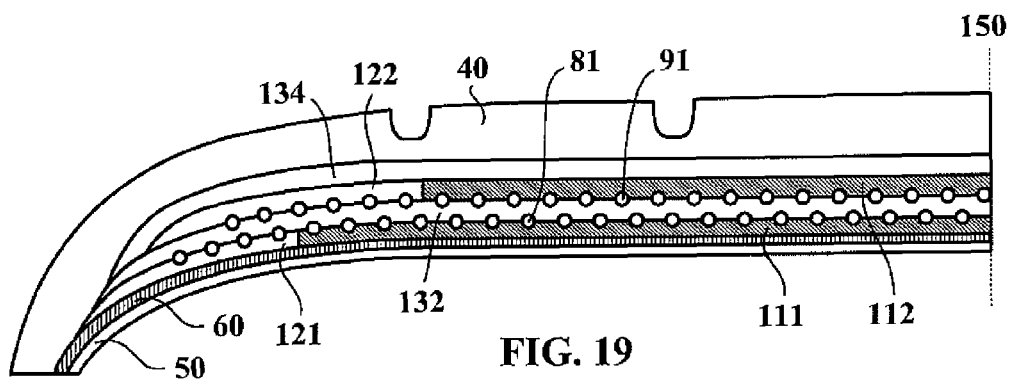

It will also be noted that the tire shown in FIG. 18 does not comprise a hooping reinforcement, nor does that shown in FIG. 19. The tire of FIG. 19 resembles in every respect the tire of FIG. 8, apart from the fact that the crown does not comprise circumferential reinforcing elements 101.

Table I provides, by way of example, the composition of six different rubber mixes M1 to M5, that can be used as a first layer of very high modulus of elasticity. The composition is provided in pce ("parts by weight percent elastomer") i.e. in parts by weight per 100 parts by weight elastomer. The corresponding modulus of elasticity MA10 is also indicated.

TABLE I

| | Parts in pce | | | | |
|---|---|---|---|---|---|
| | M1 | M2 | M3 | M4 | M5 |
| NR [1] | 100 | 100 | 100 | 50 | 50 |
| SBR [2] | — | — | — | 50 | 50 |
| N 330 [3] | 79 | 79 | 79 | 75 | 75 |
| Paraffin Oil | 3 | 3 | 3 | — | — |
| Epoxy Resin | — | — | — | 3 | 3 |
| Stearamide | — | — | — | 1.5 | 1.5 |
| Antioxidant (6PPD) [4] | 1.5 | 1.5 | 1.5 | 1.9 | 1.9 |
| Cobalt Naphthenate | 3 | 3 | 3 | 3.5 | 3.5 |
| Stearic Acid | 0.6 | 0.6 | 0.6 | 1.5 | 1.5 |
| ZnO | 8.5 | 8.5 | 8.5 | 9 | 9 |
| Diphenylol Propane | 7 | 7 | 7 | 3 | 3 |
| Formophenol Resin | 11 | 15 | 19 | 9 | 12 |
| HMT [5] | 2.65 | 3.6 | 4.6 | — | — |
| H3M [6] | 5.56 | 5.56 | 5.56 | 6 | 8 |
| Sulphur | 2.1 | 9.8 | 7.8 | 11.1 | 15.1 |
| Accelerator (TBBS) [7] | 0.95 | 2.1 | 2.4 | 1.4 | 1.9 |
| MA10 | 71 | 111 | 94 | 70 | 83 |

Notes to Table I:
[1] Natural rubber
[2] SBR with 26% styrene, 25% 1-2 polybutadiene units and 45% trans 1-4 polybutadiene units (Tg = −48° C.)
[3] Carbon black series 330 (ASTM)
[4] N-(1,3-dimenthylbutyl)-N'-phenyl-p-phenylenediamene
[5] Hexamethylenetetramine
[6] Hexamethoxymethlymelamine
[7] N-ter-butyl-2-benzothiazyle sulfenamide The layer of very high modulus is preferably based on at least one diene elastomer, a reinforcing filler and a cross-linking system.

The term "diene" elastomer (rubber) is understood in the known manner as an elastomer made at least partially (i.e. a homopolymer or a copolymer) from diene monomers i.e. monomers bearing two double carbon-carbon bonds, whether conjugated or not. The diene elastomer used is preferably selected from the group made up of polybutadienes (BR), natural rubber (NR), synthetic polyisoprenes (IR), butadiene-styrene copolymers (SBR), isoprene-butadiene copolymers (BIR), isoprene-styrene. copolymers (SIR), butadiene-styrene-isoprene copolymers (SBIR) and mixtures of these elastomers.

One preferred embodiment uses an "isoprene" elastomer, i.e. an isoprene homopolymer or copolymer, in other words a diene elastomer selected from the group consisting of natural rubber (NR), synthetic polyisoprenes (IR), the different isoprene copolymers and mixtures of these elastomers.

Isoprene elastomer is preferably made of natural rubber or a synthetic cis-1,4 polyisoprene. Amongst these synthetic polyisoprenes, preferably polyisoprenes are used having a content (mole %) of cis-1,4 bonds greater than 90%, more preferably still, greater than 98%. According to further preferred embodiments, the diene elastomer may consist entirely or partially of a further diene elastomer, such as for example an SBR (E-SBR or S-SBR) elastomer used as a coupling agent, used in a blend with a different elastomer, for example of the BR type, or unblended.

The composition of rubber may also comprise all or some of the conventional additives used in rubber matrices used for the manufacture of tires, such as for example reinforcing fillers such as carbon black or inorganic fillers such as silica, coupling agents for inorganic fillers, anti-ageing agents, antioxidants, plasticizing agents or extender oils, whether the latter are of aromatic nature or non-aromatic nature (in particular very slightly aromatic oils or non-aromatic oils, for example of the naphthenic or paraffin type, of high or preferably low viscosity, MES or TDAE oils, plasticizing resins with a high Tg, greater than 30° C.), agents facilitating the processability of compositions in the uncured state, tackifying resins, a cross-linking system based either on sulfur or on sulfur and/or peroxide donors, accelerators, vulcanization activators or retarders, antireversion agents, methylene acceptors and methylene donors, such as for example HMT (hexamethylenetetramine) or H3M (hexamethoxymethylmelamine), reinforcing resins (such as resorcinol or bismaleimide), the known adhesion promoter systems of the metal salt type, for example, in particular cobalt salt or nickel salt.

The compositions are manufactured in appropriate mixers, by using two successive preparation steps well known by the person skilled in the art: a first thermo-mechanical kneading step (known as the "non-productive" step) at high temperature, up to a maximum temperature of between 110° C. and 190° C., preferably between 130° C. and 180° C., followed by a second mechanical step (known as the "productive" step) at a lower temperature, typically less than 110° C., which is the finishing step during which the cross-linking system is incorporated.

By way of example, the non-productive step is conducted in a single thermomechanical stage of several minutes (for example between 2 and 10 minutes) during which all the necessary basic constituents and other additives, with the exception of the cross-linking or vulcanization system, are introduced into an appropriate mixer such as a conventional internal mixer. After cooling the mixture thus obtained, the vulcanization system is then incorporated in an external mixer such as a roll mill, maintained at low temperature (for example between 30° C. and 100° C.). The assembly is mixed (productive step) for several minutes (for example between 5 and 15 minutes).

The final composition thus obtained is then calendered, for example in the form of a sheet or plate for characterization (i.e. to check the rubber quality using various tests), or extruded, to form the layer (layers) of rubber mix of very high modulus used in a tire according to embodiments of the invention.

The vulcanization (or curing) may then be conducted in the known manner at a temperature generally between 130° C. and 200° C., preferably under pressure, for a sufficient time which may vary for example between 5 and 90 minutes depending, in particular, on the curing temperature, the vulcanization system adopted and the kinetics of vulcanization of the relevant composition.

Figure 20:
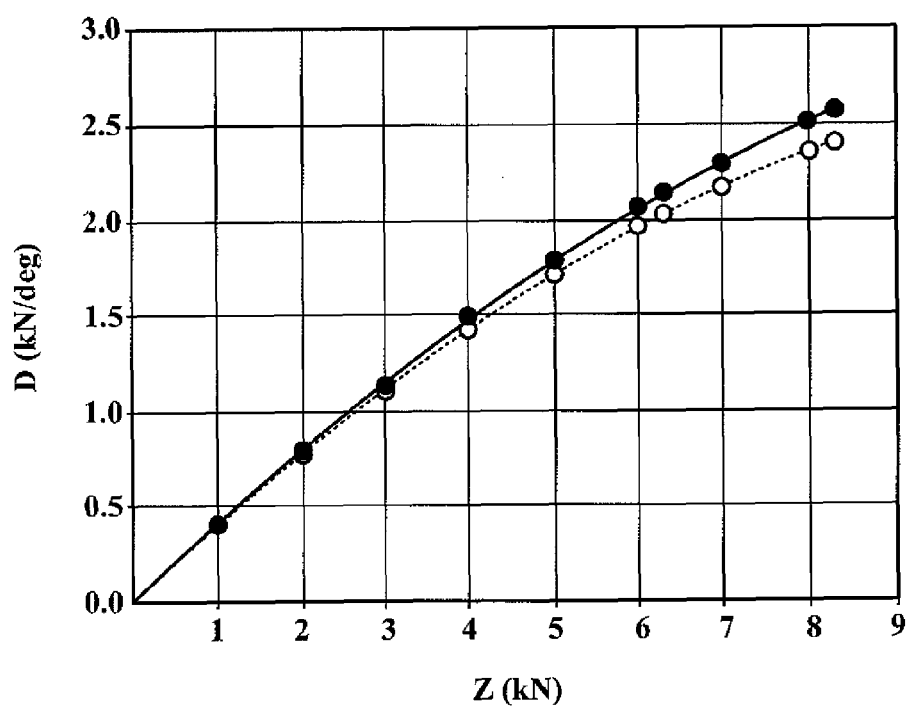
FIGS. 20 and 21 illustrate results obtained from a tire according to embodiments of the invention and from a reference tire.
Figure 21:
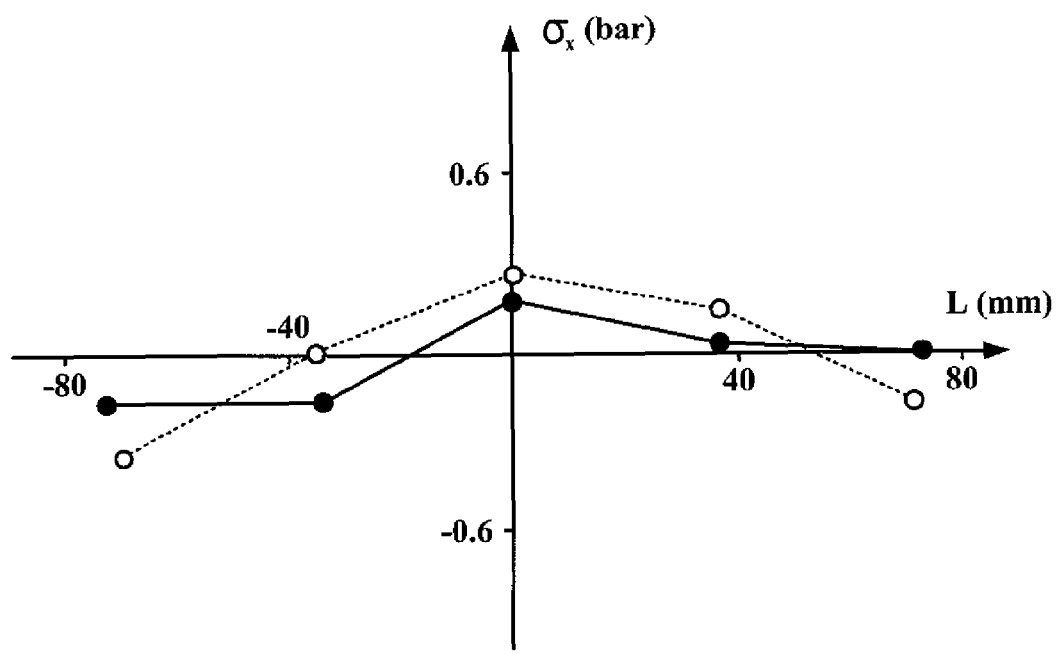

Results obtained from tires according to embodiments of the invention are illustrated in FIGS. 20 and 21. These results have been obtained from tires of dimension 225/40 R 18. The tire used had a structure close to that shown in FIG. 4, with a first layer of very high modulus of the "M1" composition (see Table I). This tire has been compared to a reference tire "Pilot Sport 2", which does not have the layer of very high modulus, but is provided with an additional hooping reinforcement in the central part of the crown. This additional hooping reinforcement centered on the central rib had a width of 2×10 mm. It was formed from polyester cables 220×3 (3 strands of 220 tex) positioned at a pitch of 1.2 mm. Apart from the differences concerning this additional hooping reinforcement and the layers of very high modulus, the tires used in these comparative tests were identical:

Rubber mix of the crown reinforcement: secant modulus of extension of 10%: 12 MPa;

Reinforcing elements of the crown reinforcement: cable 6.23 (3×2 strands, each strand having a diameter of 0.23 mm) positioned at a pitch of 1.8 mm;

Angle of the reinforcing elements relative to the circumferential direction: ±30°;

Hooping reinforcement: hybrid cable (2 strands of aramide of 167 tex and one strand of nylon of 140 tex) with an external diameter of 0.79 mm positioned at a pitch of 1 mm.

FIG. 20 illustrates the gains in terms of drift thrust. The graph shows the progression of cornering stiffness D as a function of the load Z of the tire. The filled circles correspond to the results obtained from the tire according to the invention, the empty circles correspond to the results obtained from the reference tire. It is seen that the presence of the layer of very high modulus improves in a very significant manner the thrust at high load. In other words, when it is mounted on a vehicle and rolls along, the tire according to the invention reacts more rapidly to a rapid turn of the steering wheel, and this is in spite of the absence of an additional central hooping reinforcement.

FIG. 21 illustrates the effect of the presence of layers of very high modulus on the flattening of the tire. Again, the filled circles correspond to the results obtained from the tire according to the invention, the empty circles correspond to the results obtained from the reference tire. The graph shows the stresses in x, $\sigma_x$ (i.e. the forces in the forward direction of the tire divided by the surface presented by the tire to the ground) as a function of the axial position L on the crown. The presence of the rubber mix of very high modulus allows an improved distribution of the forces within the width of the contact area. In other words, the profile of the inflated tire is flattened, which results in a significant gain in mild wear (motorway type) at the centre of the crown, in particular for a tire mounted on the driving axle. It should be noted that if the hooping reinforcement had simply been removed from the reference tire, the curve would have been offset to the greater values of $\sigma_x$ (in the order of 0.5 bar at the centre of the crown) which would have a very negative effect on the irregular wear of the crown. The presence of the layers of rubber mix of very high modulus makes it possible to return to a stress level which is much lower and better distributed over the width of the crown.

Table II summarizes further results obtained by comparing the same tire according to the invention with the reference tire.

TABLE II

|  | Tire according to the invention | Reference Tire |
| --- | --- | --- |
| Maximum Speed (km/h) | 331 ± 4 | 332 |
| Endurance without cleaving (km) | 40 000 | 40 000 |
| "Coast by" noise at 60 km/h (dB(A)) | 70.9 ± 0.7 | 69.7 |
| "Coast by" noise at 80 km/h (dB(A)) | 75.3 ± 0.8 | 73.7 |
| CRR at 90 km/h (kg/t) | 11.0 ± 0.14 | 10.6 |

The endurance when traveling at high speed is increased by subjecting each tire to a progressive increase in speed, according to predetermined levels, until the tire is destroyed. The "maximum speed" is the maximum speed reached before destruction. The results obtained confirm that the tires according to the invention obtain substantially the same "maximum speed" as the reference tire and this is in spite of the absence of an additional central hooping reinforcement.

This observation is corroborated by the results obtained in "endurance without cleaving". In these tests, a tire is rolling on a flywheel, with an overload of 990 daN, at an inflation of 2.8 bar and a camber of −2°. The tire travels over a distance of 40,000 km, unless it is destroyed before this total kilometrage, then the state of the crown (broken cables, initiation of cleaving, etc.) is examined. In this case, the tire according to the invention and the reference tire both reached 40,000 km without significant damage.

As was mentioned above, one of the reasons which would deter the person skilled in the art from using rubber mixes of very high modulus in a tire crown, lies in the expected increase of noise generated by a crown thus rigidified. However, surprisingly, this drawback is less pronounced than might have been feared, as the results of "coast by" noise show. The "coast by" noise is representative of the acoustic discomfort to which a person is subjected by the passage of a vehicle at constant speed on a motorway-type road of intermediate grading: a vehicle is made to pass at a given speed, with the transmission in neutral and the engine switched off, over a standardized measurement area (International Standard ISO DIS 10 844); microphones register the noise levels in dB(A).

Finally, Table II shows that the use of rubber mixes of very high modulus slightly degrades the rolling resistance. The coefficient of rolling resistance (CRR) is defined as $$CRR = \frac{F_{RR}}{Z}$$

where $F_{RR}$ denotes the force of rolling resistance which opposes the rotation of a tire rolling at stable speed on a surface, and Z denotes the load of the tire. This coefficient depends on the traveling speed. At 90 km/h, the tire according to the invention has a CRR coefficient greater by approximately 4% relative to the reference tire. This result is not surprising, as rubber mixes of very high modulus are inevitably more hysteretic.

In summary, the use of rubber mixes of very high modulus in the crown makes it possible to improve both the cornering stiffness of the tire and its flattening, while preserving excellent endurance, these advantages being obtained at the expense of a slight degradation of noise and of the coefficient of rolling resistance. The invention thus makes it possible to obtain a compromise in performance which is very advantageous, in particular for tires for passenger vehicles designed for use at high speed.

The invention claimed is:

1. A tire comprising:
    two beads configured to come into contact with a mounting rim;
    two sidewalls extending the beads radially to the outside, the two sidewalls being joined together in a crown,
    wherein the crown comprises a crown reinforcement extending axially between two axial ends and surmounted by a tread; and
    a carcass reinforcement comprising a plurality of carcass reinforcing elements, the carcass reinforcement being anchored in the two beads and extending across the sidewalls to the crown;
    wherein the crown comprises, radially on the inside of the tread and radially on the outside of the carcass reinforcement, at least one first layer of rubber mix having a modulus of elasticity which is greater than or equal to 50 MPa, this first layer extending from the median plane of the tire axially to the outside, on both sides of the median plane, only as far as an axial distance from the median plane which is less than the axial distance of the axial end of the crown reinforcement from the median plane, said first layer of rubber mix being extended axially to the outside, on both sides of the median plane, by a second layer of rubber mix having a modulus of elasticity which is less than or equal to 20 MPa.

2. The tire of claim 1, wherein the modulus of elasticity of the first layer of rubber mix is greater than or equal to 100 MPa.

3. The tire of claim 1, wherein the crown reinforcement comprises at least two reinforcing layers, each comprising a plurality of filamentary crown reinforcing elements, said filamentary crown reinforcing elements being parallel to one another in each layer and the reinforcing elements of one layer extending crosswise with respect to those of the other, forming with the circumferential direction angles of between 10° and 70°, and in which said first and second layers of rubber mix are located between at least two of said reinforcing layers.

4. The tire of claim 3, wherein the number of reinforcing layers of the crown reinforcement is greater than or equal to three, and wherein a said first and a said second layer of rubber mix are located between each pair of adjacent reinforcing layers.

5. The tire of claim 3, wherein said first and second layers of rubber mix are in contact with the reinforcing elements of the adjacent reinforcing layers.

6. The tire of claim 3, wherein a third layer of rubber mix separates said first and second layers of rubber mix from the reinforcing elements of the closest reinforcing layers.

7. The tire of claim 3, further comprising a hooping reinforcement, arranged radially outside the crown reinforcement, said hooping reinforcement being formed from at least one reinforcing element oriented circumferentially wherein one first and two second layers of rubber mix are located radially between the hooping reinforcement and the radially outermost reinforcing layer of the crown reinforcement.

8. The tire of claim 3, wherein one first and two second layers of rubber mix are located radially inside the radially innermost reinforcing layer of the crown reinforcement.

9. The tire of claim 1, further comprising a hooping reinforcement, arranged radially outside the crown reinforcement, said hooping reinforcement being formed from at least one reinforcing element oriented circumferentially.

10. The tire of claim 9, wherein one first and two second layers of rubber mix are located radially outside the hooping reinforcement.

11. The tire of claim 1, wherein the carcass reinforcement extends axially across the entire crown and in which one first and two second layers of rubber mix are located radially between the crown reinforcement and the carcass reinforcement.

12. The tire of claim 1, wherein the axial distance between the axial ends of each first layer and the closest axial end of the crown reinforcement is greater than 10 mm.

13. The tire of claim 1, wherein the crown reinforcement comprises at least two reinforcing layers, each comprising a plurality of filamentary crown reinforcing elements, said filamentary crown reinforcing elements being parallel to one another in each layer and the filamentary crown reinforcing elements of one layer extending crosswise with respect to those of the other, forming with the circumferential direction angles of between 10° and 70°, and in which said first and second layers of rubber mix are located between at least two of said reinforcing layers, wherein the axial distance between the axial ends of each first layer and the closest axial end of the crown reinforcement is greater than 10 mm, wherein the reinforcing layers of the crown reinforcement do not all have the same axial width and wherein the axial distance between the axial ends of each first layer and the closest axial end of the reinforcing layer of smallest axial width of the crown reinforcement is greater than 10 mm.

\* \* \* \* \*